United States Patent
Matthies et al.

(10) Patent No.: US 8,532,874 B2
(45) Date of Patent: Sep. 10, 2013

(54) METHOD FOR OPERATING A CONTROL UNIT FOR HEAT-SENSITIVE ACTUATORS

(75) Inventors: Thomas Matthies, Hannover (DE); Oliver König, Hannover (DE)

(73) Assignee: Continental Aktiengesellschaft, Hannover (DE)

( * ) Notice: Subject to any disclaimer, the term of this patent is extended or adjusted under 35 U.S.C. 154(b) by 236 days.

(21) Appl. No.: 12/841,633

(22) Filed: Jul. 22, 2010

(65) Prior Publication Data

US 2010/0292848 A1 Nov. 18, 2010

Related U.S. Application Data

(63) Continuation of application No. PCT/EP2008/065454, filed on Nov. 13, 2008.

(30) Foreign Application Priority Data

Jan. 23, 2008 (DE) .......... 10 2008 005 645

(51) Int. Cl.
*G05D 23/19* (2006.01)

(52) U.S. Cl.
USPC .......................... 701/37; 700/275

(58) Field of Classification Search
USPC ...................... 701/36, 37; 700/275
See application file for complete search history.

(56) References Cited

U.S. PATENT DOCUMENTS

| | | | |
|---|---|---|---|
| 6,042,265 A | 3/2000 | Kliman et al. | |
| 6,171,065 B1 * | 1/2001 | Wode | 417/32 |
| 6,212,451 B1 * | 4/2001 | Kutscher et al. | 701/37 |
| 2005/0173881 A1 * | 8/2005 | Harrison et al. | 280/124.16 |
| 2007/0098564 A1 * | 5/2007 | Sorge | 417/32 |
| 2008/0048591 A1 * | 2/2008 | Hamada et al. | 318/9 |

FOREIGN PATENT DOCUMENTS

| | | |
|---|---|---|
| DE | 19860762 A1 | 7/2000 |
| DE | 102005021490 A1 | 11/2006 |

OTHER PUBLICATIONS

International Search Report dated Nov. 19, 2009.

\* cited by examiner

*Primary Examiner* — Ryan Zeender
*Assistant Examiner* — Kristie A Mahone
(74) *Attorney, Agent, or Firm* — Laurence A. Greenberg; Werner H. Stemer; Ralph E. Locher

(57) ABSTRACT

A method for operating a control unit for heat-sensitive actuators includes first disabling the control unit after a thermal loading, which is calculated on the basis of the computing model, of at least one actuator has reached a threshold.

11 Claims, 1 Drawing Sheet

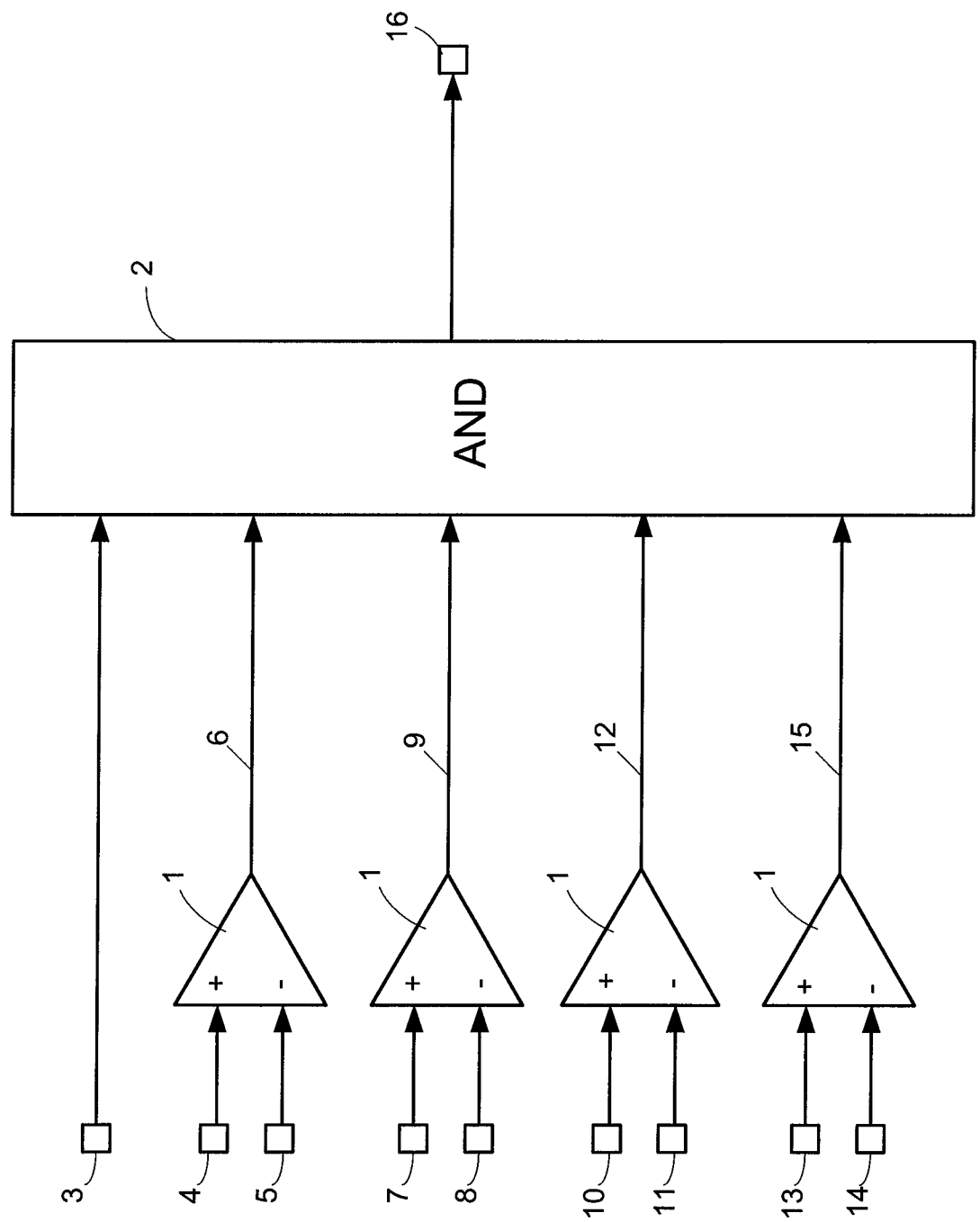

METHOD FOR OPERATING A CONTROL UNIT FOR HEAT-SENSITIVE ACTUATORS

CROSS-REFERENCE TO RELATED APPLICATION

This application is a continuation, under 35 U.S.C. §120, of copending international application No. PCT/EP2008/065454, filed Nov. 13, 2008, which designated the United States; this application also claims the priority, under 35 U.S.C. §119, of German patent application No. DE 10 2008 005 645.6, filed Jan. 23, 2008; the prior applications are herewith incorporated by reference in their entirety.

BACKGROUND OF THE INVENTION

Field of the Invention

The invention relates to a method for operating a control unit for heat-sensitive, temporarily operated actuators or devices which interact within a system having a plurality of actuators or devices that are controlled by one control unit. The thermal loading for at least one of the actuators or devices is calculated on the basis of a computation model at any time.

Within systems having heat-sensitive actuators or devices, that is to say, for example, within air suspension systems for vehicles, overheating of the system components and devices has to be avoided as far as possible. The associated actuators and devices, such as compressors, valves, motors etc., which are operated with the aid of supplied energy are usually designed only for operation for a limited amount of time, and therefore such systems can be constructed in as cost-effective a manner as possible. Such parts are generally not intended to be operated over the long term and long-term operation would lead to an increased thermal loading.

On account of a long-term loading or given excessively quick successive switch-on operations, motors or compressors, in particular, can be excessively heated, depending on the ambient conditions of the respective actuator or the device, these conditions including, for example, the actual ambient temperature, existing insulating materials or adjacent heat sources, to such an extent that functional faults may occur.

Temperature sensors on the appropriate parts could generate warning signals but are generally not present on all components for reasons of cost. Since the thermal loading on an actuator (or device) is usually a function of the running time/operating time/activation time, the running time of a control unit is measured and used to draw conclusions about the thermal loading on the actuator (or the device) in the prior art. This dependency/function follows a computation model which is tailored to each actuator (or device) and the environmental conditions around the actuator (or the device).

If the actuator or the device is activated, the thermal loading on the actuator increases in most cases. This is generally called the heating or heat-up phase of the actuator (or the device). If the actuator is not activated, it cools down in most cases and the thermal loading falls. This is called the cooling or cool-down phase of the actuator.

After a specific activation time, the actuator is thermally loaded to such an extent that it is switched off and therefore the heating phase is terminated. The length of the heating phase can vary depending on the computation model used. This is the case, for example, when variables, such as the ambient temperature, are entered into the computation model. Accordingly, the deactivation time can be variable.

By way of example, the computation model of the compressor provides the actual compressor head temperature. The compressor head is the point of the compressor which is subjected to the greatest loading by operation. If the compressor is activated, the compressor head temperature rises. The compressor head temperature must not exceed a maximum compressor head temperature (KKT-max). The control unit terminates compressor operation when the compressor head temperature, which is calculated using the computation model, reaches the threshold "KKT-max". The heating-up phase is thus terminated and the cooling-down phase begins. The computation model provides a falling compressor head temperature in the cooling-down phase. If the compressor head temperature reaches or falls below a lower threshold (minimum KKT, KKT-min), the compressor is cooled down to such an extent that the compressor can be reactivated.

A compromise is often necessary when defining the threshold. The first factor to be taken into consideration is that the compressor should be made available to the system again as quickly as possible, and secondly the compressor should be able to be subjected to thermal loading for a sufficiently long period of time.

Furthermore, each actuator has an associated requisite cool-down period $\Delta t_{(T1 \to T0)}$, which is empirically determined (by experiments) and taking into consideration the installation situation, depending on the temperature model, and during this cool-down period the actuator has to cool down again, after thermal loading produced by operation, before it can be switched on again. In this context, $T_1$ is the temperature at which the actuator has to be switched off in order to avoid overheating, and $T_0$ is the threshold, in this case a threshold temperature or normal temperature which permits continued operation within the system.

For the purpose of optimized energy balance in a system or vehicle, all of the energy consumers of a system are usually switched off when the entire system is no longer in use. In the abovementioned systems having control units, this leads, for example, to the power supply to the control unit also being switched off. As a result, the computation devices of said control unit no longer operate and all the information about the last actual operating state of the system is lost. The information lost in particular is the information about whether all of the heat-sensitive actuators or devices had cooled down to below a threshold/threshold temperature as was necessary for them or have run through their requisite cooling-down period upon switch-off, that is to say whether said actuators or devices had cooled down again, after thermal loading produced by operation, to such an extent that they could be switched on again and would be available to the system for a sufficient amount of time.

If, however, said actuators or devices have not yet sufficiently cooled down to below a predetermined threshold, for example an air suspension compressor had not sufficiently cooled down if the vehicle or the associated air suspension control unit was switched off and switched on again during a traffic light phase, and the compressor were restarted despite insufficient cooling, overheating could occur. In order to prevent this in the prior art, it is usually assumed, each time the control unit is switched on again, that the thermal loading on actuators and devices is at a maximum (worst case) and the maximum cooling-down period has to pass before said actuators and devices are restarted. This disadvantageously leads to the system, or the air suspension, being inoperative for a few minutes after the control unit is switched on.

SUMMARY OF THE INVENTION

It is accordingly an object of the invention to provide a method of operating a control unit for heat-sensitive, temporarily operated actuators or devices which overcomes the disadvantages of the heretofore-known devices and methods of this general type and which provides for the system, which is associated with the control unit and includes actuators and devices, to be ready for use again as quickly as possible after it has been switched off, without the need for expensive auxiliary devices.

With the foregoing and other objects in view there is provided, in accordance with the invention, a method of operating a control unit for heat-sensitive, intermittently operated actuators or devices connected to interact within a system containing a plurality of actuators controlled by the control unit. The novel method comprises the following steps:

calculating a thermal loading for at least one of the actuators or devices on a basis of a computation model at any time;

upon receiving a signal commanding the control unit to switch off, switching off the control unit only after the thermal loading on the at least one actuator or device, as calculated on the basis of the computation model in the calculating step, has fallen below a given threshold.

In the process according to the invention, on event of a signal, which is supplied to the control unit, for switching off the control unit, the control unit is switched off only after the thermal loading on the actuator, which thermal loading is calculated on the basis of the computation model, has reached or has fallen below a threshold. The control unit is therefore switched off only after a run-on time $\Delta t_{run-on}$, with the run-on time being the period of time which passes, starting from the switch-off signal, until the lower thermal loading threshold of the actuator is reached and is produced indirectly by means of the computation model. In this case, the control unit uses the computation model to calculate the actual thermal loading on the actuator. If the actual thermal loading on the actuator has reached the switch-off threshold, the run-on time is terminated and the control unit is disconnected from the power supply.

On account of such controlled cooling down of the actuators/devices, all the system functions can be used immediately, without a waiting time, after the control unit is switched off and switched on again. This ensures a significant increase in the readiness of the system.

One advantageous development of the method involves its use for operating a control unit of an air suspension system of a vehicle, with the thermal loading for a compressor that is present in the air suspension system being calculated on the basis of a computation model at any time, and the control unit being switched off only after the thermal loading on the compressor, which thermal loading is calculated on the basis of the computation model, has reached a threshold. Compressors and valves are usually the components which are mostly subjected to loading by the development of heat, and therefore particular efficiency of the method is achieved here.

Therefore, a further advantageous development of the method is produced in that, in order to operate a control unit of an air suspension system of a vehicle, the thermal loading for a valve which is present in the air suspension system is calculated on the basis of a computation model at any time, with the control unit being switched off only after the thermal loading on the valve, which thermal loading is calculated on the basis of the computation model, has reached a threshold.

In accordance with an advantageous development of the method the thermal loading is calculated on the basis of a temperature model using a temperature at any time, with the control unit being switched off only after the temperature, which is calculated on the basis of the temperature model, has reached a lower limit temperature $T_0$. Temperature models of this type can be easily determined by corresponding series of experiments for individual components and are manageable in terms of the computation expenditure which is then required.

A development of the method which is both advantageous and simple involves the thermal loading being calculated using a switch-on period at any time, with the control unit being switched off only after the switch-on period has reached a lower limit value. Specifying the switch-on period is customary in mechanical engineering and forms part of the documentation as a basis of the design in many assemblies. Time sequences can be checked very accurately and easily by control units.

A further advantageous embodiment of the method involves the thermal loading for all the actuators or thermally loaded devices in the air suspension system being calculated on the basis of a computation model at any time, with the control unit being switched off only after all the actuators or devices have reached their thresholds. Therefore, the actuators or thermally loaded devices in the air suspension system have an associated cooling-down period $\Delta t_{(T \to T0)}$ which is required according to the temperature model, with the control unit being switched off only after the longest of the determined run-on times. Therefore, a significant increase in the readiness of the system is ensured together with protection against overheating of all the components involved.

An advantageous development of the method involves, given a signal, which is supplied to the control unit, for switching off the control unit, the thermal loading state being stored, and on the basis of this the thermal loading being calculated starting from the stored thermal loading state after the control unit is restarted.

Although cooling down again is, in principle, thus shifted to the time after switch-on, as in the prior art for example, this cooling-down period is reduced by taking into account the cooling already performed before switch-off.

Other features which are considered as characteristic for the invention are set forth in the appended claims.

Although the invention is illustrated and described herein as embodied in a method for operating a control unit for heat-sensitive actuators, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The sole FIGURE of the drawing is a logic diagram with which the functioning of the method according to the invention is illustrated in a level-control system, that is to say in an air suspension system of a vehicle which is controlled by way of a control unit.

DETAILED DESCRIPTION OF THE INVENTION

Referring now to the FIGURE of the drawing in detail, the method proceeds from a state in which the compressor in the system has already been in operation for some time and it is assumed, in accordance with a temperature model, that, after this run time, the compressor head is at an actual temperature of 150° C. ($T_K$). A corresponding signal 5 is applied to one of the comparators 1 which is present in the computation unit of the control unit.

The driver switches off the ignition upon leaving the vehicle, as a result of which a signal 3 for switching off the control unit is transmitted to an AND gate 2 which is present in the computation unit of the control unit. However, the control unit is not yet actually switched off.

The threshold temperature 4 of the compressor head of 40° C. (switch-off temperature $T_0$) is also applied to the same comparator 1, which is present in the computation unit of the control unit, to which the signal 5 is also applied. As soon as the actual cooling-down period $\Delta t_{(TK \rightarrow T0)}$, which is determined on the basis of the temperature model for the compressor, for cooling down the temperature of the compressor head is sufficient to fall below the threshold of $T_0=40°$ C., a corresponding signal 6 is transmitted to the AND gate 2 in the control unit. The signal 6 indicates that, solely on the basis of the temperature conditions at the compressor head, the control unit could now be switched off.

Equally, the respective cooling down period $\Delta t_{(TV \rightarrow T0)}$ for cooling down the temperatures of three valves is checked. In this case, the threshold values, which are in each case determined on the basis of corresponding run-time models, for the switch-on period, that is to say for reaching a temperature which corresponds to the threshold for the switch-on period, are transmitted as signals 7, 10 and 13 to the comparators 1 which are present in the computation unit of the control unit. As soon as the cooling-down period 8, 11 and 14, which is determined from the actual switch-on period on the basis of the temperature model/switch-on period model for the respective valve and is likewise provided as a signal, is sufficient for the temperature to fall below the normal temperature of the respective valve, a corresponding signal 9, 12 and 15 is transmitted to the AND gate 2 in the control unit. These signals indicate that, on the basis of the temperature conditions at the respective valve, the control unit can be enabled for switch-off.

The control unit is actually switched off by the switch-off signal 16 only when all the signals 6, 9, 12 and 15 are provided in addition to the original switch-off command signal 3.

The following list summarizes the various reference numerals shown in the drawing and used in the text for identifying the structure and several signals used in the device:

1) Comparator
2) AND gate
3) Signal for switching off the control unit
4) Signal (compressor head temperature threshold value (threshold))
5) Signal (compressor head actual temperature)
6) Signal (normal temperature/threshold reached/compressor head)
7) Signal (switch-on period threshold value of the first valve)
8) Signal (existing switch-on period of the first valve)
9) Signal (threshold switch-on period reached/first valve)
10) Signal (switch-on period threshold value of the second valve)
11) Signal (existing switch-on period of the second valve)
12) Signal (threshold switch-on period reached/second valve)
13) Signal (switch-on period threshold value of the third valve)
14) Signal (existing switch-on period of the third valve)
15) Signal (threshold switch-on period reached/third valve)
16) Switch-off signal for the control unit.

The invention claimed is:

1. A method of operating a control unit for heat-sensitive, temporarily operated actuators or devices connected to interact within a system containing a plurality of actuators controlled by the control unit, the method which comprises:
   calculating, by the control unit, a thermal loading for at least one of the actuators or devices on a basis of a computation model at any time;
   upon receiving a signal commanding the control unit to switch off, switching off the control unit only after the thermal loading on the at least one actuator or device, as calculated on the basis of the computation model in the calculating step, has fallen below a given threshold.

2. The method according to claim 1, wherein the control unit is a controller of an air suspension system of a vehicle, and the method comprises continuously calculating the thermal loading for a compressor that is present in the air suspension system on the basis of a computation model, and switching off the controller only after the thermal loading on the compressor, as calculated on the basis of the computation model, has fallen below a given threshold.

3. The method according to claim 2, which comprises calculating the thermal loading on a basis of a temperature model using a temperature at any time, and switching off the control unit only after the temperature, as calculated on the basis of the temperature model, has reached a lower limit temperature $T_0$.

4. The method according to claim 2, which comprises calculating the thermal loading using a switch-on period at any time, and switching off the control unit only after the switch-on period has reached a lower limit value.

5. The method according to claim 2, wherein the control unit is a controller of an air suspension system of a vehicle, and the method comprises continuously calculating the thermal loading for a valve that is present in the air suspension system on the basis of a computation model, and switching the controller off only after the thermal loading on the valve, as calculated on the basis of the computation model, has fallen below a given threshold.

6. The method according to claim 1, wherein the control unit is a controller of an air suspension system of a vehicle, and the method comprises continuously calculating the thermal loading for a valve that is present in the air suspension system on the basis of a computation model, and switching the controller off only after the thermal loading on the valve, as calculated on the basis of the computation model, has fallen below a given threshold.

7. The method according to claim 6, which comprises calculating the thermal loading on a basis of a temperature model using a temperature at any time, and switching off the control unit only after the temperature, as calculated on the basis of the temperature model, has reached a lower limit temperature $T_0$.

8. The method according to claim 6, which comprises calculating the thermal loading using a switch-on period at any time, and switching off the control unit only after the switch-on period has reached a lower limit value.

9. The method according to claim 1, which comprises calculating the thermal loading for all actuators or thermally loaded devices in the air suspension system on the basis of a computation model at all times, and switching off the control unit only after all the actuators or devices have reached their thresholds.

10. The method according to claim 1, which comprises, upon receiving the signal for switching off the control unit, storing a thermal loading state, and calculating the thermal loading based on and starting from the stored thermal loading state when the control unit is restarted.

11. A method of operating a control unit, comprising:
controlling with a control unit a plurality of heat-sensitive, temporarily operated actuators or devices, the actuators or devices being connected to interact within a system containing a plurality of actuators controlled by the control unit;

calculating, by the control unit, a thermal loading for at least one of the actuators or devices on a basis of a computation model at any time;

upon receiving a signal commanding the control unit to switch off, switching off the control unit only after the thermal loading on the at least one actuator or device, as calculated on the basis of the computation model in the calculating step, has fallen below a given threshold.

* * * * *